(12) United States Patent
Kossira et al.

(10) Patent No.: US 8,322,241 B2
(45) Date of Patent: Dec. 4, 2012

(54) ACTUATOR FOR A WHEEL GUIDING ELEMENT OF WHEEL SUSPENSIONS

(75) Inventors: Christoph Kossira, Ingolstadt (DE); Karl-Heinz Meitinger, Trostberg (DE); Wilfried Michel, Riedenburg (DE)

(73) Assignee: Audi AG, Ingolstadt (DE)

( * ) Notice: Subject to any disclaimer, the term of this patent is extended or adjusted under 35 U.S.C. 154(b) by 883 days.

(21) Appl. No.: 12/398,859

(22) Filed: Mar. 5, 2009

(65) Prior Publication Data

US 2009/0223322 A1 Sep. 10, 2009

(30) Foreign Application Priority Data

Mar. 5, 2008 (DE) .......................... 10 2008 012 686

(51) Int. Cl.
*F16H 25/20* (2006.01)
(52) U.S. Cl. .... 74/89.25; 74/89.29; 185/37; 280/86.757
(58) Field of Classification Search ................. 74/89.25, 74/89.29; 280/5.512, 5.514, 5.515, 124.134, 280/86.757; 185/37
See application file for complete search history.

(56) References Cited

U.S. PATENT DOCUMENTS

| | | | | |
|---|---|---|---|---|
| 2,387,800 A | * | 10/1945 | Leland et al. | 318/14 |
| 3,049,359 A | * | 8/1962 | Geyer | 280/6.159 |
| 5,060,959 A | | 10/1991 | Davis et al. | |
| 5,678,847 A | * | 10/1997 | Izawa et al. | 280/5.515 |
| 5,886,605 A | * | 3/1999 | Ulerich et al. | 335/172 |
| 7,938,473 B2 | * | 5/2011 | Paton et al. | 296/146.8 |
| 2005/0051988 A1 | | 3/2005 | Gradu et al. | |

FOREIGN PATENT DOCUMENTS

| | | |
|---|---|---|
| DE | 3836255 A1 | 4/1990 |
| DE | 19955410 A1 | 5/2001 |
| DE | 10120102 A1 | 10/2002 |
| DE | 102005023250 A1 | 11/2006 |
| DE | 10 2006 020 041 A1 | 3/2007 |
| DE | 102006020041 A1 | 3/2007 |
| EP | 1958800 A2 | 8/2008 |

* cited by examiner

Primary Examiner — William C Joyce
(74) Attorney, Agent, or Firm — Novak Druce + Quigg LLP

(57) ABSTRACT

An actuator for a wheel guiding element of motor vehicle wheel suspensions, with a first, preferably electrically driven actuating drive which selectively changes the length of the wheel guiding element, in the actuator there being a compensation spring which counteracts the compressive forces acting on the wheel guiding element. According to the invention, the pretensioning force of the compensation spring can be changed by means of a second, preferably electrically driven actuating drive.

15 Claims, 1 Drawing Sheet

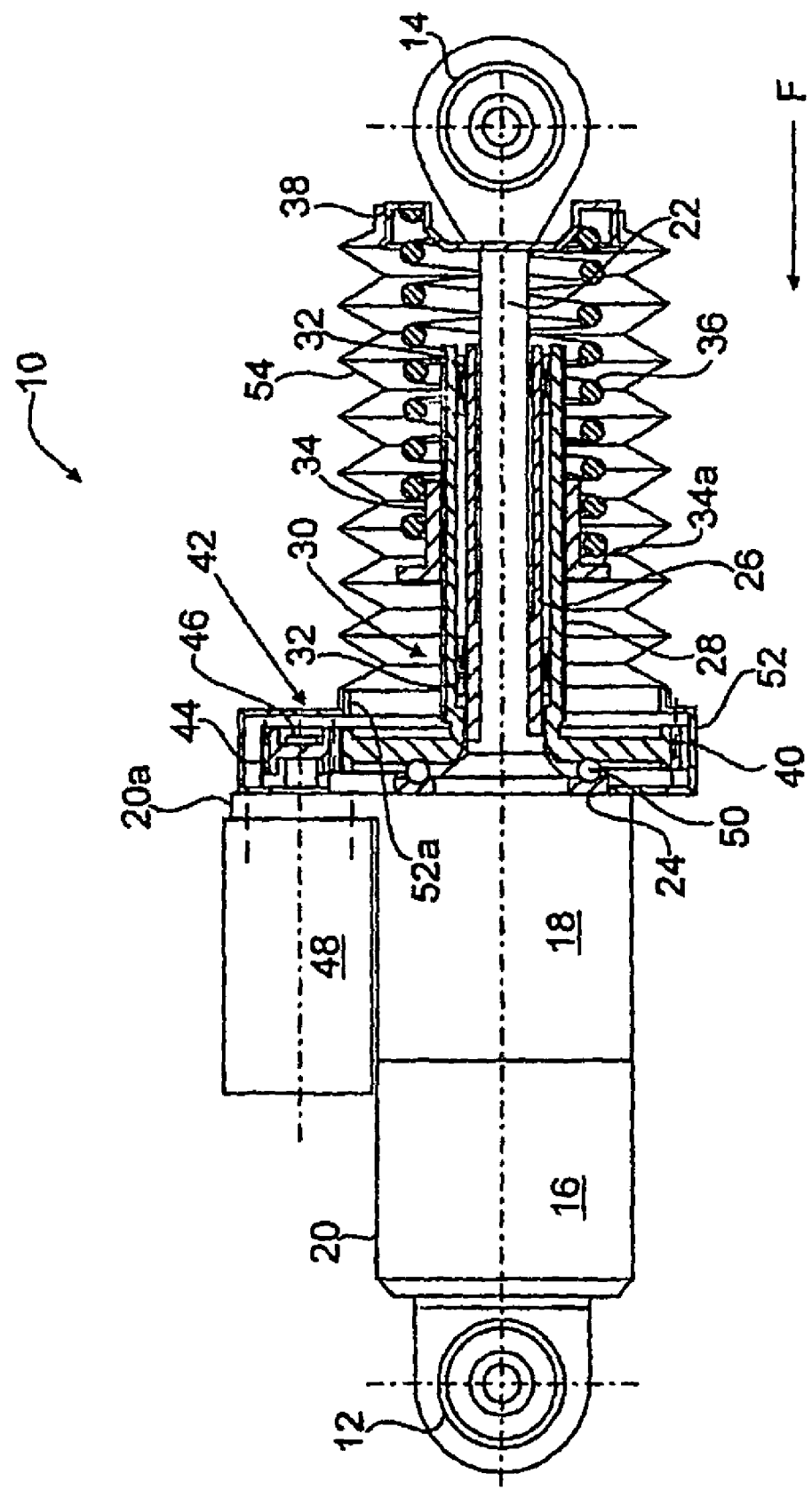

ACTUATOR FOR A WHEEL GUIDING ELEMENT OF WHEEL SUSPENSIONS

BACKGROUND OF THE INVENTION

Actuators are used for track adjustment on the rear axles of motor vehicles. Here actuators without force equalization and actuators with force equalization are known. In actuators without force equalization, all the applied forces must be equalized using the actuator. This results in greater energy demand.

A generic actuator with force equalization is known from DE 10 2006 020 041 A1. The actuator shown here is used in active wheel suspensions. With it, changes in track of the wheels or other parameters of the wheel suspension relevant to driving stability, for example, also changes of camber, etc., can be carried out selectively. The wheel guiding elements can be steering tie rods, connecting rods, etc., which on the one hand are coupled to the body of the motor vehicle and on the other to the wheel carrier, and by changes of their length by way of the integrated actuator, the track values and/or camber values of the wheels can be changed accordingly. In the known actuator there is a compensation spring which counteracts the compressive forces which occur due to the loading states and driving situations in the wheel guiding element and thus advantageously reduces the actuating forces to be applied in the actuator.

The compensation spring of the actuator counteracts the compressive forces with essentially constant pretensioning. Changes of the compressive force due to varying loading state, level positions and the like conversely cannot be equalized.

The object of the invention is to propose an actuator of the generic type which takes into account the static and dynamic loads of the actuator occurring in the wheel suspensions to an even greater degree and enables an even greater reduction of the actuating forces which occur in the actuator.

SUMMARY OF THE INVENTION

According to the invention, in addition to the first actuating drive, i.e., the main actuator which changes the length of the wheel guiding element, there is a second actuating drive. The second actuating drive can change the pretensioning force of the compensation spring by way of an actuating pinion. Thus it is possible to always match the compensation spring or its pretensioning force to the changing compressive forces in the wheel guiding element and thus to optimally reduce the actuating forces. The objective here is for the compressive forces from the wheel suspension and the pretensioning force of the compensation spring to continuously counterbalance one another and thus accordingly to effectively relieve the actuator with the electric motor and the actuating gear.

The equalization of the varying compressive forces according to the invention reduces the required force for adjusting the length of the actuator.

This reduces the energy consumption of the system. The required maximum force of the actuating pinion of the main actuator can thus be significantly reduced; this leads to a power-reduced design of the first actuating pinion, that is, of the main actuator. Mechanical design of the main actuator can therefore be done based on much smaller actuating and holding forces, as a result of which the weight and installation space can be reduced.

The pretensioning force of the compensation spring can be advantageously changed depending on the loading state and/or the parameters of the motor vehicle pertaining specifically to driving and thus can at least roughly control continuous equalization of the compressive forces which can vary conventionally with increasing loading of the motor vehicle, with increasing speed and/or on curves for correspondingly high lateral forces on the wheels, but also for uneven roadways, etc.

Furthermore, the pretensioning force of the compensation spring can be changed depending on the power consumption of the first servomotor in an especially advantageous manner. This means that by the corresponding control engineering evaluation of power consumption of the servomotor, the compressive forces which instantaneously occur can be deduced and accordingly the power consumption of the servomotor can be minimized in adaptive control by matching the pretensioning force of the compensation spring.

In a structurally favorable manner the second actuating pinion which acts on the compensation spring can be located coaxially to the actuating rod of the first actuating gear and can be driven by way of an electric motor which is located adjacently and axially parallel to the first servomotor with the actuating gear. This enables an especially compact design of the actuator.

Furthermore, the compensation spring which is formed by a helical compression spring and which is located around the actuating rod can be supported on a threaded nut which is guided on a threaded sleeve which is driven by way of a stepped-down intermediate transmission. The intermediate transmission can be a worm gear mechanism or preferably a cylindrical gear mechanism. The pretensioning force of the compensation spring can be adjusted in a manner which is simple in terms of production engineering by way of a thread mechanism which is for the most part self-locking.

Furthermore the intermediate transmission viewed in the axial direction can be positioned between the first actuating gear and the compensation spring and thus can be integrated into the actuator in a structurally favorable manner or in an axially especially short manner. Here, moreover, the driven gear of the intermediate transmission can be made in one piece with the threaded sleeve of the second actuating pinion in a manner which is favorable for production engineering.

The threaded sleeve can furthermore be pivoted to achieve favorable symmetrical support of the pretensioning forces of the compensation spring on a housing-mounted guide sleeve which is located around the actuating rod of the first actuating gear. The rotary support of the threaded sleeve and of the driven gear of the intermediate transmission is preferably formed by two radial anti-friction bearings and one axial anti-friction bearing which is located between the driven gear and the radial flange of the guide sleeve. This ensures durable and low-wear rotary support.

Finally, in a manner which is favorable to construction and production engineering, the electric motor with the actuating gear and the second electrically driven actuating pinion can be integrated into the common housing of the wheel guiding element.

BRIEF DESCRIPTION OF THE DRAWINGS

One embodiment of the invention is detailed below. The schematic drawing shows a partial longitudinal section through an actuator which is integrated into a connecting rod of a wheel suspension for motor vehicles with an electrically driven actuating pinion for variable adjustment of the pretensioning forces of an integrated compensation spring.

DETAILED DESCRIPTION OF THE PREFERRED EMBODIMENT OF THE INVENTION

In the drawing the connecting rod or steering tie rod of a rear wheel suspension for motor vehicles which is not shown is designated as 10 and is coupled by way of rubber-metal sleeve articulations 12, 14 on the one hand to the body or to the auxiliary frame of the motor vehicle and on the other hand to a wheel carrier of the wheel suspension. The connecting rod 10 on its one end 14 acts on the steering arm of the wheel carrier so that when the length of the connecting rod 10 changes, the wheel carrier is pivoted conventionally around the steering axle formed by another connecting rod for adjusting the track of the rear wheel. The connecting rod 10 can, however, also be used in another known arrangement for adjusting the wheel camber, for example.

An electric servomotor 16 and an actuating gear 18 are integrated into the connecting rod 10 for its longitudinal adjustability and are located in a common housing 20 on which the articulation 12 is also accommodated. The actuating gear 18 acts on the actuating rod 22 to drive it; on its end the second articulation 14 is formed.

For possible design or execution of the electric motor 16 and of the actuating gear 18, for example, reference is made to the aforementioned DE 10 2006 020 041 A1, in which the electric motor 18 drives the ball nut of a ball screw whose threaded spindle is connected to the actuating rod 22 so that when the ball nut turns, the threaded spindle with the actuating rod 22 is axially displaced and causes the length of the connecting rod 10 to change. The actuating gear 18 can, however, also be made by a single thread drive without balls supported in between.

In contrast to the indicated execution of the servomotor 16 and of the actuating gear 18, in the embodiment shown here, the electric motor 16 and the actuating gear 18 can be coaxially aligned in a manner which is not detailed; that is, the servomotor 16 and the actuating gear 18 are axially behind one another in a structurally favorable manner.

By way of a flanged section 24 the guide sleeve 26 is attached to the housing 20 of the connecting rod 10 and extends over part of the length of the actuating rod 22 around the latter.

On the guide sleeve 26 the threaded sleeve 28 of a second actuating pinion 30 is pivoted by way of two radial anti-friction bearings or needle bearings 32. The threaded sleeve 28 has an outside thread which interacts with the inside thread of a threaded nut 34 which is screwed onto the threaded sleeve 28.

Around the threaded nut 34 and the threaded spindle 28 and around the actuating rod 22 there is a compensation spring 36 which is made as a helical compression spring 36 and which on the one hand is supported on a ring collar 34a of the threaded nut 34, which collar projects radially down to the outside, and on the other hand on a stop cup 38 on the actuating rod 22 or on the articulation 14.

The compensation spring 36 by way of the actuating pinion 30 thus counteracts the compressive forces (arrow F) which occur with a defined pretensioning force from the coupling of the connecting rod 10 to the wheel carrier of the wheel suspension which is not shown.

The driven gear 40 of a stepped-down intermediate transmission 42 is molded onto the threaded sleeve 28. The drive pinion 44 of the transmission is attached on the drive shaft 46 of an electric motor 48 which is located axially parallel to the servomotor 16 and to the actuating gear 18. The electric motor 48 is attached to a radially downward projecting housing flange 20a by way of screws which are not shown.

To support the axial forces which are applied by way of the compensation spring 36 there is an axial anti-friction bearing (thrust bearing) 50 between the flanged section 24 of the guide sleeve 26 and the driven gear 40 on the threaded sleeve 28.

Finally, to cover the intermediate transmission 42 and the threaded pinion 30 with the compensation spring 36, there are a plastic hood 52 attached to the housing 20 and a rubber-elastic protective sleeve 54 which is connected thereto, the protective sleeve 54 being fixed on a ring collar 52a of the hood 52 and on the stop cup 38.

By electrical triggering of the electric motor 48 in one direction of rotation or the other the ball nut 34, which is held nonrotatably by way of the compensation spring 36, is displaced to the left or right axially on the drawings by way of the intermediate transmission 42 and the threaded pinion 30, as a result of which the pretensioning of the compensation spring 36 is decreased or increased and thus can be adapted to variable compressive forces F of the wheel suspension.

The servomotor 16 and the electric motor 48 are connected to an electronic control which is not shown, such as an electronic driving stability program (ESP®) via which on the one hand the track of the pertinent wheel or its steering angle is set conventionally. Furthermore, by triggering the electric motor 48 by way of the second actuating pinion 42, 30 the pretensioning of the compensation spring 36 is changed such that it equalizes the compressive forces F which are instantaneously occurring from the wheel suspension.

The electronic control device processes the signals which indicate the loading state of the motor vehicle, its speed, the yaw rate when negotiating curves, roadway unevenness, etc., computes therefrom the compressive forces F which have been determined by empirical studies and controls the corresponding pretensioning force of the compensation spring 36 such that the pretensioning force and the compressive force F at least roughly cancel one another out. The instantaneous pretensioning force of the compensation spring 36 can be determined by means of a travel sensor or a pressure sensor (not shown) integrated into the actuating pinion 42, 30.

In contrast or in addition thereto, by way of adaptive electronic control, the power consumption of the servomotor 16 can be evaluated and the electric motor 48 of the actuating drive 42, 30 can be controlled such that the power consumption of the servomotor is set to a minimum. This minimum value corresponds to optimum equalization between the pretensioning force of the compensation spring 36 and the instantaneously occurring compressive forces F.

The invention claimed is:

1. An actuator for a wheel guiding element of motor vehicle wheel suspensions, with a first electrically driven actuating drive which selectively changes the length of the wheel guiding element, in the actuator there being a compensation spring which counteracts the compressive forces acting on the wheel guiding element, wherein the pretensioning force of the compensation spring can be changed by means of a second electrically driven actuating drive wherein the second actuating drive acts by way of an actuating pinion on the compensation spring; the actuating pinion which acts on the compensation spring is located coaxially to an actuating rod of a first actuating gear of the first actuating drive and is driven by way of the second actuating drive which is located adjacently and axially parallel to the first actuating drive with the actuating gear; and the compensation spring which is formed by a helical compression spring and which is located around the actuating rod is supported on a threaded nut which is guided on a stepped-down threaded sleeve.

2. The actuator according to claim 1 wherein the pretensioning force of the compensation spring can be advantageously changed depending on at least one of the loading state and the parameters of the motor vehicle pertaining specifically to driving.

3. The actuator according to claim 1 wherein the pretensioning force of the compensation spring can be changed depending on the power consumption of the first actuating drive.

4. The actuator according to claim 1 wherein the actuating pinion defines an intermediate transmission via which the threaded sleeve is driven.

5. The actuator according to claim 4 wherein the intermediate transmission viewed in the axial direction is positioned between the first actuating gear and the compensation spring.

6. The actuator according to claim 4 wherein a driven gear of the intermediate transmission is made in one piece with the threaded sleeve of the second actuating pinion.

7. The actuator according to claim 1 wherein the threaded sleeve is rotated on a housing-mounted guide sleeve which is located around the actuating rod of the first actuating gear.

8. The actuator according to claim 7 wherein at least one of a rotary support of the threaded sleeve and of the driven gear of the intermediate transmission is formed by radial anti-friction bearings and one axial anti-friction bearing which is located between the driven gear and a flanged section of the guide sleeve.

9. The actuator according to claim 1 wherein the first actuating drive with the actuating gear and the second actuating drive with the actuating pinion are integrated in a common housing of the wheel guiding element.

10. A rod assembly of a motor vehicle comprising:
a housing operatively connectable to one of a wheel carrier and a body of said vehicle;
a rod supported on said housing, axially displaceable relative to said housing and connectable to the other of said wheel carrier and said body of said vehicle;
a servomotor supported on said housing and operatively connected to said rod for axial displacement of said rod;
a cylindrical member having a portion of said rod extending therethrough, and a threaded outer surface, fixed relative to said housing and rotatable about the axis of said rod;
an abutment member threaded on said cylindrical member;
a spring interposed between said abutment member and an engagement surface of said rod, operable to exert an extending force on said rod; and
means supported on said housing and operatively connected to said cylindrical member for selectively rotating said cylinder member and correspondingly altering the biasing force exerted by said spring.

11. A rod assembly according to claim 10 wherein said means for rotating said cylindrical member is operable responsive to operation of said servomotor.

12. A rod assembly according to claim 10 wherein said cylindrical member includes a portion engaging a set of bearings supported on said housing.

13. A rod assembly according to claim 10 wherein said spring comprises a coil spring encompassing said cylindrical member between opposed surfaces of portions of said abutment and said rod.

14. A rod assembly according to claim 10 wherein said means for rotating said cylindrical member includes a second servomotor operable responsive to the operation of said first mentioned servomotor.

15. A rod assembly according to claim 14 wherein said means operatively connected to said cylinder member comprises a gear drive.

* * * * *